United States Patent
Kyperountas et al.

(10) Patent No.: US 7,548,517 B2
(45) Date of Patent: Jun. 16, 2009

(54) METHOD AND APPARATUS FOR DETERMINING THE LOCATION OF A NODE IN A WIRELESS SYSTEM

(75) Inventors: Spyros Kyperountas, Weston, FL (US); Neiyer S. Correal, Cooper City, FL (US); Feng Niu, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 586 days.

(21) Appl. No.: 11/113,637

(22) Filed: Apr. 25, 2005

(65) Prior Publication Data

US 2006/0239202 A1    Oct. 26, 2006

(51) Int. Cl.
    *G01R 31/08*    (2006.01)
(52) U.S. Cl. .................. 370/252; 342/453; 342/458
(58) Field of Classification Search ............ 370/252; 342/453, 458
    See application file for complete search history.

(56) References Cited

U.S. PATENT DOCUMENTS

| | | | |
|---|---|---|---|
| 6,473,038 B2 | 10/2002 | Patwari et al. | |
| 6,571,082 B1* | 5/2003 | Rahman et al. | 455/67.11 |
| 2002/0122003 A1* | 9/2002 | Patwari et al. | 342/450 |
| 2003/0060213 A1 | 3/2003 | Heinonen et al. | |
| 2003/0157932 A1* | 8/2003 | Chitrapu | 455/423 |
| 2004/0095276 A1 | 5/2004 | Krumm et al. | |
| 2005/0195109 A1* | 9/2005 | Davi et al. | 342/463 |
| 2005/0246334 A1* | 11/2005 | Tao et al. | 707/5 |
| 2005/0259676 A1* | 11/2005 | Hwang | 370/436 |
| 2005/0285792 A1* | 12/2005 | Sugar et al. | 342/465 |

OTHER PUBLICATIONS

Lee W. Young, "PCT International Search Report and Written Opinion," WIPO, ISA/US, Aug. 22, 2007.

* cited by examiner

*Primary Examiner*—Seema S Rao
*Assistant Examiner*—Sai-Ming Chan

(57) ABSTRACT

A location technique is utilized where channel-model parameters are originally estimated prior to location taking place. Location then takes place using a first set of known-located nodes, and the channel-model parameters are updated based on the distances resulting from the location estimate. Once the channel-model parameters have been updated, location again takes place using a second set of known-located nodes, node distances are calculated based on the produced locations and the channel-model parameters are again updated. This process continues until no significant change is observed between the previous and the newly estimated location, or until a maximum number of iterations is reached.

16 Claims, 4 Drawing Sheets

100

METHOD AND APPARATUS FOR DETERMINING THE LOCATION OF A NODE IN A WIRELESS SYSTEM

FIELD OF THE INVENTION

The present invention relates generally to radiolocation and in particular, to a method and apparatus for determining the location of a node within a wireless communication system.

BACKGROUND OF THE INVENTION

A variety of systems have been proposed that call for the ability to determine the location of an object within a wireless communication system. For example, in asset control, it is desirable to know the locations of objects (e.g., laptop computers, cell phones, . . . , etc.) within the confines of an office building. Prior-art wireless location techniques run the gamut from space-consuming, expensive circuitry that provides very accurate location estimates, to inexpensive, non-space-consuming circuitry that provides very gross location estimates. As is evident, there typically exists a tradeoff between accurate location techniques that are space-consuming and expensive to implement, and less expensive non-space consuming techniques that provide less accurate location estimates. It would be beneficial to improve on a less-expensive approach so that a more accurate determination of location can be made with very little added circuitry. Therefore a need exists for a method and apparatus for determining the location of an object within a wireless communication system that is relatively inexpensive, yet provides accurate location estimates.

DETAILED DESCRIPTION OF THE DRAWINGS

In order to address the above-mentioned need, a method and apparatus for determining the location of an object within a wireless communication system is provided herein. During operation, a location technique is utilized where channel-model parameters are originally estimated prior to location taking place. Location then takes place using a first set of known-located nodes, and the channel-model parameters are updated based on the location estimate. Once the channel-model parameters have been updated, location again takes place using a second set of known-located nodes, and the channel-model parameters are again updated. This process continues until no significant change is observed between the previous and the newly estimated location, or until a maximum number of iterations is reached.

The present invention encompasses a method for determining a node's location within a communication system. The method comprises the steps of determining a plurality of distances to nodes within the communication system based on first channel-model parameters, producing a first location of the node based on the first set of distances, and calculating new channel-model parameters based on the nodes location. The plurality of distances to nodes are recalculated within the communication system based on the second channel-model parameters and a second location of the node is produced based on the recalculated distances.

The present invention additionally encompasses a node comprising a receiver receiving transmissions from a plurality of nodes and logic circuitry determining a plurality of distances to nodes within the communication system based on first channel-model parameters and received signal strengths of the transmissions. The logic circuitry additionally produces a first location of the node based on the plurality of distances, updates the channel-model parameters based on the nodes location, determines a second plurality of distances to nodes within the communication system based on the second channel-model parameters, and produces a second location of the node based on the second plurality of distances.

Figure 1:
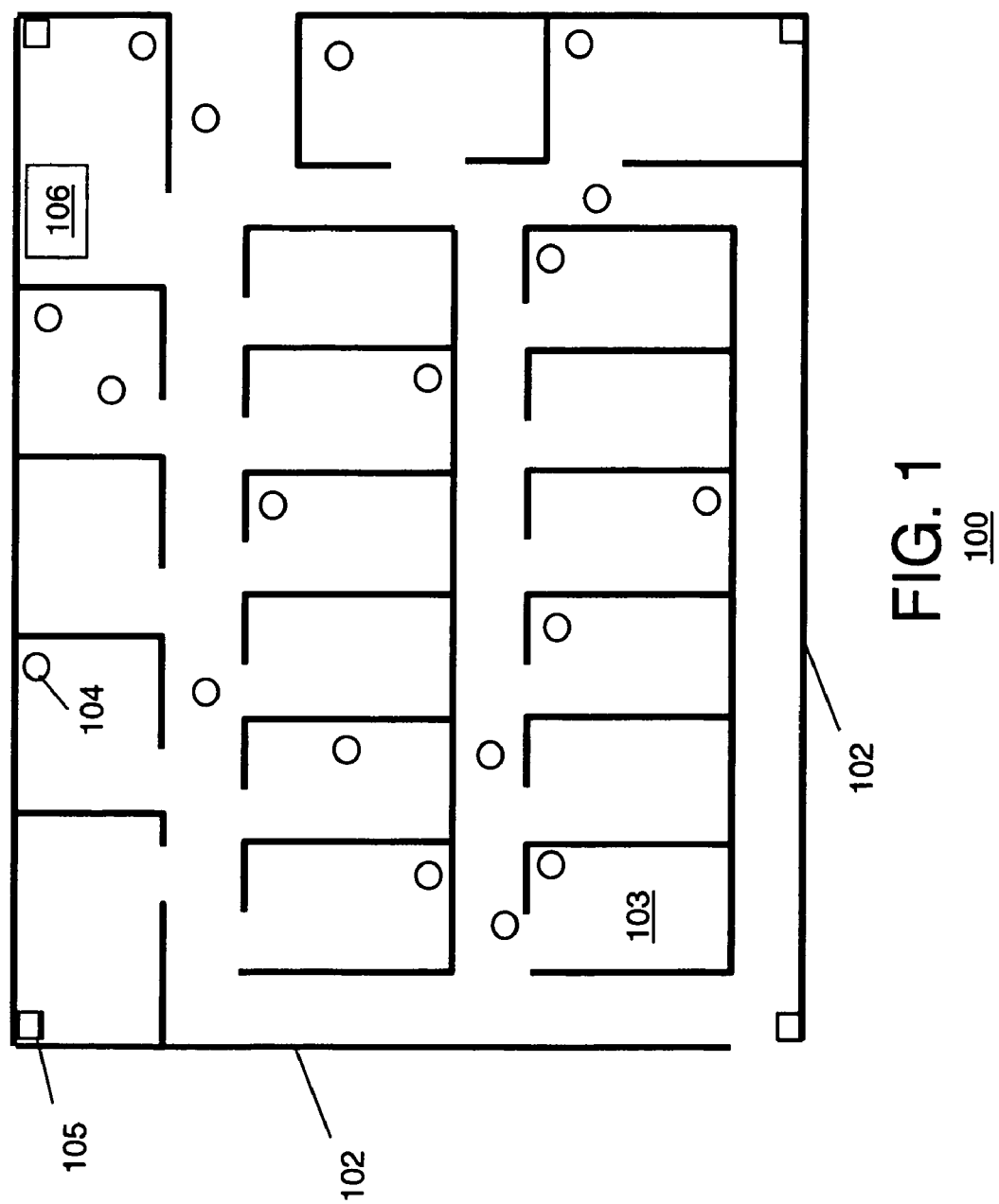
FIG. 1 is illustrates a typical floor plan of an office building in which are located a number of wireless devices involved in determining each other's location.

Turning now to the drawings, wherein like numerals designate like components, FIG. 1 is a block diagram of communication system 100 deployed over a floor plan of an interior of an office building. Communication system 100 comprises a number of wireless devices 104-106 involved in determining a particular node's location. The office building comprises perimeter wall 102 that encloses a plurality of offices 103 (only one labeled).

Circular objects, or nodes 104 (only one labeled) represent wireless devices, the locations of which are unknown and to be determined. Because the location of nodes 104 are unknown, these nodes 104 are referred to as "blindfolded" nodes. Nodes 104 can include, for example, transceiver security tags attached to valuable assets such as lap top computers, or be embedded in wireless communication devices including cellular telephones. Rectangular objects 105 (only one labeled) represent reference nodes. The locations of nodes 105 are known, or can be easily and accurately determined to within some measurement accuracy (e.g., via physical measurement or via GPS).

It should be noted that although FIG. 1 shows nodes 104-106 existing within a two-dimensional space, one of ordinary skill in the art will recognize that nodes 104-106 may be located in other environments, including 3-dimensional spaces. For example, nodes 104 may comprise golf carts equipped with wireless transceivers located on a golf course. In a similar manner, nodes 104 may comprise inventory located within a multi-level warehouse. Irrespective of the environment where nodes 104 operate, reference nodes 105 are dispersed in known locations to assist in locating blindfolded nodes 104. More particularly, a location technique is utilized where channel-model parameters are originally estimated prior to location taking place. Location then takes place using a first set of known-located nodes, and the channel-model parameters are updated based on the location estimate. Once the channel-model parameters have been updated, location again takes place using a second set of known-located nodes (i.e., nodes with locations that are known a priori or have been estimated), the distances between estimated locations are used with the RSSI information to estimate and update the channel-model parameters. This process continues until no significant change is observed between the previous and the newly estimated location, or until a maximum number of iterations is reached.

In U.S. Pat. No. 6,473,038, METHOD AND APPARATUS FOR LOCATION ESTIMATION, which is incorporated by reference herein, an innovative location estimation technique was disclosed in which the locations of wireless nodes are estimated using received signal strength (RSS) measurements between devices In the preferred embodiment of the present invention the RSS is again utilized, but location estimation is performed in an iterative fashion. Also, during location all calculations involved in determining the location of a blindfolded node take place within the blindfolded node itself, however in an alternate embodiment, a processing node 106 serves as location-finding equipment (LFE) to perform calculations involved in determining the location of blindfolded nodes 104.

A received signal strength indication (RSSI) reading is a number reported by the node's receiver circuitry that represents the power of the node's received packets. Thus, if the distance between a first and a second node is to be estimated by the first node, the first node will first determine the RSSI of a received transmission from the second node. The translation from RSSI to received power is performed, and a distance to the second node is calculated based on the received power of the node and a channel model. More particularly, the RSSI is converted to received power via a RSSI vs. Power transfer curve. The power is then translated to path loss (attenuation) by taking into account the known transmitted power of each device according to:

$$PL_{dB} = Pt_{dBm} - Pr_{dBm}$$

where $Pt_{dBm}$ is the transmitted power and $Pr_{dBm}$ is the received power. After the path loss is computed, a distance is calculated to the node based on the path loss and a channel model. In order to obtain an accurate distance estimate, it is critical to have an appropriate channel model.

Channel Model Parameter Calculation:

Although any channel model relating path-loss to distance may be utilized, as an example let the channel model used to relate the path loss to separation distance be the simple and well-documented log-distance path loss model given by:

$$PL_{db}(d) = \underbrace{PL_{dB}(do)}_{A} + n * 10\log(d) \quad (1)$$

where $d_o=1$ m, $PL_{dB}(d)$ is the Path Loss in dB at distance d and n is the path loss coefficient that indicates the rate at which path loss increases with distance. With this model, the parameters A and n (usually A is in the order of 40 dBm for a transmit power of 0 dBm while n usually takes on values between 2-8) need to be accurately determined in order for accurate distance estimates to be achieved. In order to accomplish this, these values are estimated by performing a Least Squates (LS) linear fit of $PL_{dB}(d_i)$ vs. 10log(di) for i=1: N available point pairs.

Path Loss to Range Translation

After the channel-model parameters are calculated, the path loss from every link can now be translated to range using (1) as:

$$d = 10^{\frac{PL_{dB}(d)-A}{10n}} \quad (2)$$

The range estimates can then be used to locate the node via simple multilateration Iterative Channel Estimation:

As discussed above, in the preferred embodiment of the present invention an iterative method is performed in order to determine the correct channel parameters (e.g., A and n). During operation a node wishing to locate itself will have initial values for the channel parameters. Ideally, these values are chosen so that any range estimate is going to be underestimated. If enough reference node links exist, another option is to use these links to obtain this initial channel parameter information, by relating each reference to reference link RSS to the known distances between the reference devices.

Next, pair wise distances are estimated from the node wishing to locate itself to all nodes within communication range based on channel parameters. When using the log-distance path loss model, the distance is estimated to all nodes within communication range per equation (2). Once the distances to all nodes within communication range are determined, a location estimate is made by the node wishing to locate itself based on the distances to all known-located nodes, wherein the known-located nodes can be reference nodes and/or the blindfolded nodes with estimated-location. Alternatively, if location finding equipment 106 is performing the location, LFE 106 will determine the distances. As discussed the location estimate may be made by simple multi-lateration techniques, or any multitude of techniques known in the art for determining a location estimate.

Once a location has been determined, new channel-model parameters are determined using the path loss information from known-located nodes. In other words, first, the distances between the node wishing to locate itself and all the known-located neighbored nodes are calculated based on the estimated location information using an Euclidian distance metric, then those distance values are input into equation (2) and new channel-model parameters are obtained. Once the new channel-model parameters are obtained, then the distances are estimated to all nodes within communication range per equation (2). Once the distances to all nodes within communication range are determined, a location estimate is made by the node wishing to locate itself based on the distances to all known-located nodes. The above steps are repeated until the node's location converges to a point or a maximum number of iterations is reached. It is envisioned that on subsequent iterations through the above-algorithm, more and more blindfolded nodes will have located themselves so that more nodes will be utilized in the channel model estimation and the location finding technique, thus more accurately reflecting the node's true location.

Although the above technique was given with respect to a node wishing to locate itself, it should be noted that location finding-equipment 106 may be employed to locate nodes. When this happens, location-finding equipment 106 will receive path-loss measurements from all nodes and then will attempt to locate each node within the communication system by determining distances to known-located nodes, and then determining each node's location. Once the locations have been determined, the distances between the node wishing to locate itself and all the known-located neighboring nodes are calculated based on the location information with the Euclidian distance equation, then those distance values are input into equation (2) and new channel-model parameters are determined and location-finding equipment 106 will again reprocess the existing data with the new location data, and will attempt to locate all nodes with the updated channel-model parameters. The process repeats until the nodes' locations converge or a maximum number of iterations are reached.

Figure 2:
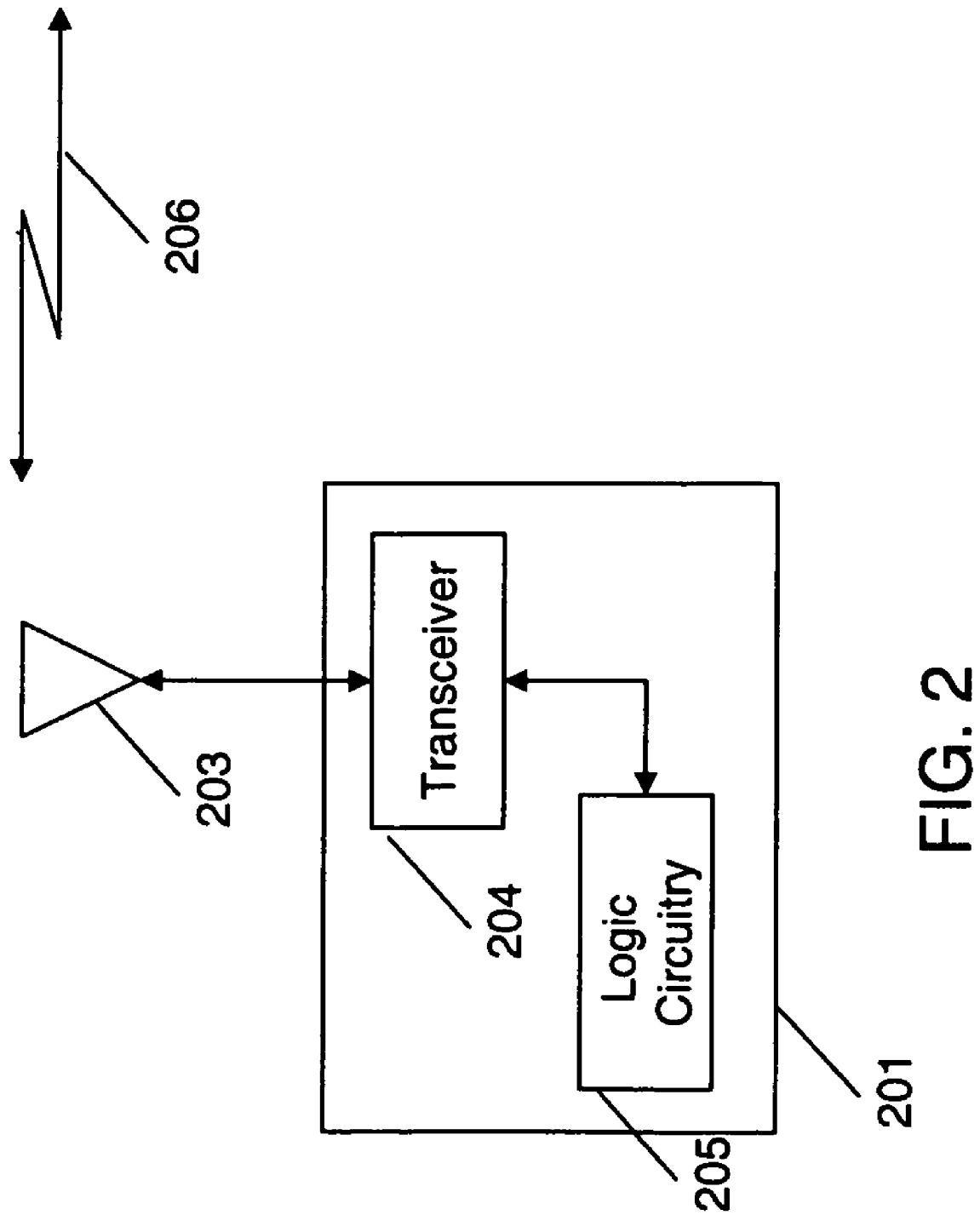
FIG. 2 is a block diagram of a node equipped to determine a location.

FIG. 2 is a block diagram of a node 201 equipped to determine its location via path loss measurements. Node 201 may comprise a blindfolded node, or alternatively, may comprise LFE 106. In a preferred embodiment of the present invention blindfolded node 201 comprises antenna 203 coupled to transmitter/receiver (transceiver) 204, in turn, coupled to logic circuitry 205. Although various forms for antenna 203, transceiver 204, and logic circuitry 205 are envisioned, in a preferred embodiment of the present invention blindfolded node 201 is formed from a Freescale Inc. MC13192 transceiver 204 coupled to a Motorola HC08 8-bit processor 205.

When blindfolded node 201 wishes to determine its location, it receives over-the-air communication signal 206 transmitted from all nodes 104 and 105. Communication signal 206, received from located (e.g., reference) nodes 105 comprises a physical location of reference node 105 (e.g., (x,y,z) components) for each node 105, while communication signal 206 received from blindfolded nodes 104 comprises a known sequence. Once signal 206 is received by transceiver 204, RSSI values are obtained by logic circuitry 205. Logic circuitry 205 then estimates the distance to each node via equation (2), and then determines a location for itself. Logic circuitry 205 then 30 obtains new channel-model parameters based on its location and again determines RSSI values from received signals transmitted by nodes within the communication system. A new location is determined and compared to the previously-determined location. The process either repeats, or if the locations are sufficiently close, the process ends. Additionally, the process may end after a predetermined number of maximum iterations.

Figure 3:
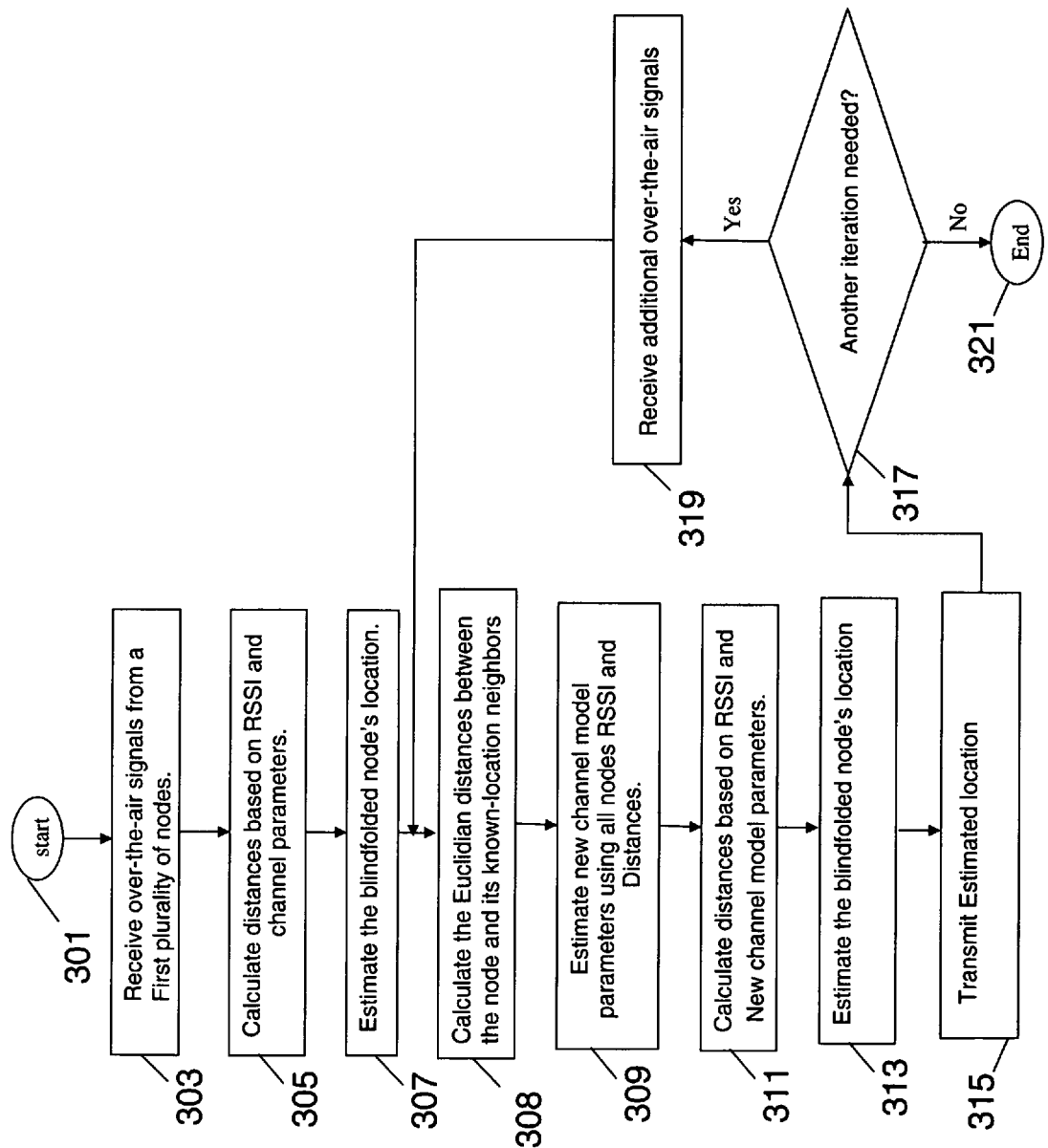
FIG. 3 is a flow chart showing operation of the node of FIG. 2.

FIG. 3 is a flow chart showing operation of the blindfolded node of FIG. 2 during location estimation. The logic flow begins at step 301. At step 303 transceiver 204 receives a plurality of over-the-air signals from a first plurality of nodes 104-105 within communication range. A first plurality of distances is calculated by logic circuitry 205 to the first plurality of nodes (step 305). As discussed, these distances will be based on the RSS of each received signal, and a channel model having first channel parameters.

At step 307 a first physical location is calculated by circuitry 205 for the blindfolded node. As discussed, the physical location is based on the blindfolded node's distance from known-located nodes. Logic circuitry 205 then calculates new Euclidian distances (second) between the node and the known-location neighboring nodes (step 308). Logic circuitry 205 then calculates new (second) channel-model parameters (step 309) based on the calculated Euclidian distances, and the logic flow continues to step 311 where the distances to the first plurality of nodes are recalculated based on the new channel-model parameters. The blindfolded node's location is recalculated to produce a second location based on the recalculated distances (step 313) and the logic flow continues to step 315.

At step 315 the recalculated location is transmitted via transceiver 204 to other nodes within the communication system via transceiver 204. This is done to further aide other nodes wishing to locate themselves by giving the other nodes another located node to aide in location estimation. After broadcasting/transmitting its location, the logic flow continues to step 317 where logic circuitry 205 determines if iteration is needed. As discussed, the above process repeats until the nodes' locations converge or a maximum number of iterations is reached. If, at step 317 it is determined that iteration is not needed (i.e., the location converges), the logic flow ends at step 321, otherwise the logic flow continues to step 319 where additional over-the-air signals are received. More particularly, the additional over-the-air signals comprise location estimates from previously blindfolded nodes. The logic flow then returns to step 305 where further location estimates are made.

Figure 4:
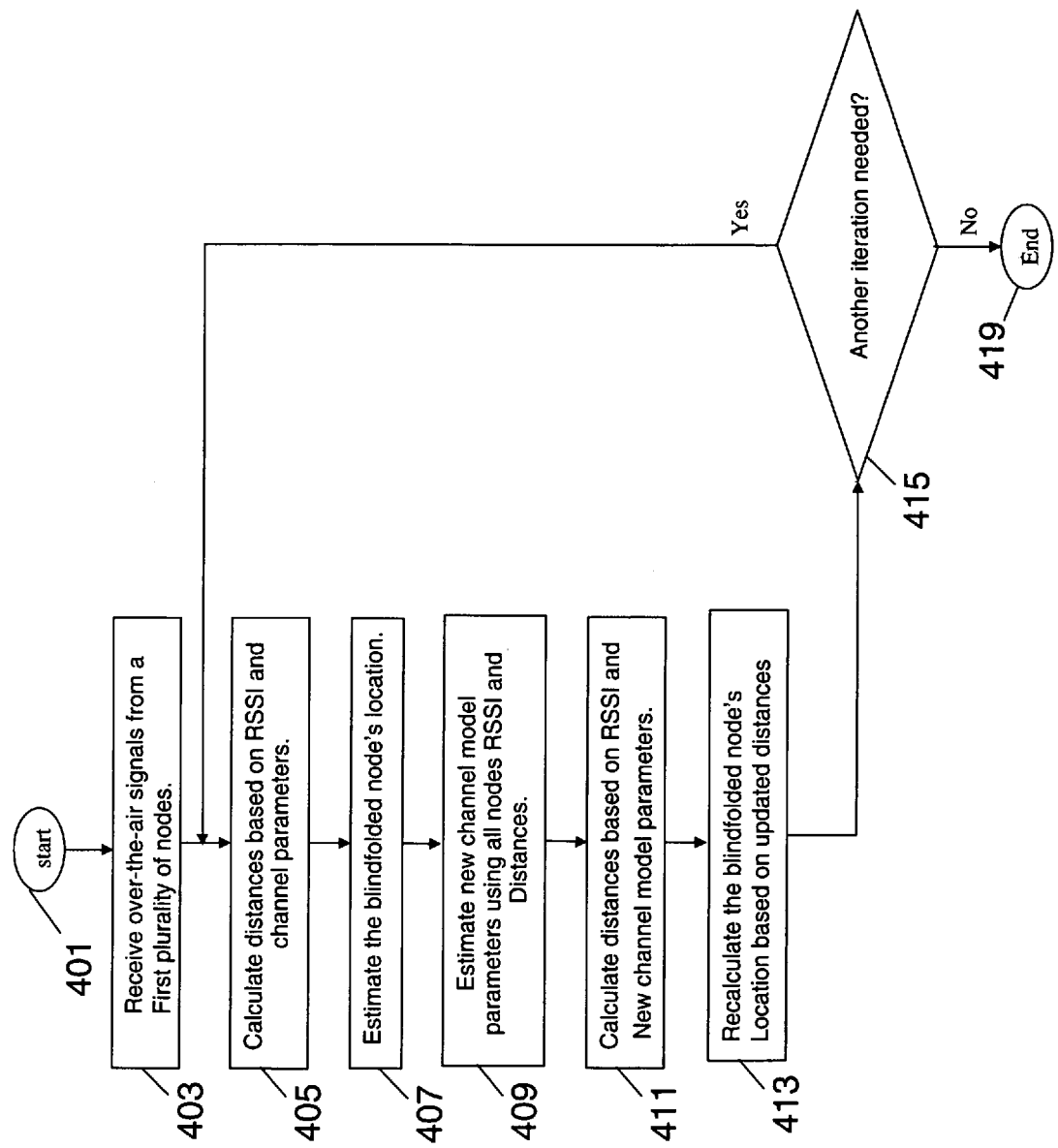
FIG. 4 is a flow chart showing operation of LFE 106 during location of blindfolded nodes.

FIG. 4 is a flow chart showing operation of LFE 106 during location of blindfolded nodes. The logic flow begins at step 401. At step 403 transceiver 204 receives a plurality of over-the-air signals from nodes 104-105 within communication range. A plurality of distance measurements are calculated by logic circuitry 205. More particularly, distances between each node is calculated (step 405). As discussed, these distances will be based on the RSS of each received signal, and a channel model having first channel parameters.

At step 407 a physical location is calculated by circuitry 205 for the blindfolded nodes within the communication system. As discussed, the physical location is based on the blindfolded node's distance from known-located nodes. Logic circuitry 205 then calculates new channel-model parameters (step 409) based on these locations, and the logic flow continues to step 411 where the distances are recalculated based on the new channel-model parameters. The blindfolded nodes locations are recalculated based on the updated distances (step 413) and the logic flow continues to step 415.

At step 415 logic circuitry 205 determines if iteration is needed. As discussed, the above process repeats until the nodes' locations converge or a maximum number of iterations are reached. If, at step 415 it is determined that iteration is not needed, the logic flow ends at step 419, otherwise the logic flow returns to step 405.

While the invention has been particularly shown and described with reference to a particular embodiment, it will be understood by those skilled in the art that various changes in form and details may be made therein without departing from the spirit and scope of the invention. For example, in some cases, it may be desirable to perform radiolocation calculations without using microprocessor resources. One skilled in the art recognizes that a hardware implementation of the invention is readily targeted toward integrated circuit fabrication processes in which logic functions are feasible. Examples of such fabrication processes include UMC or Freescale 90 nanometer CMOS. A hardware implementation is preferably but not necessarily integrated with a transceiver in a system-on-chip (SoC).

The invention claimed is:

1. A method for determining a node's location within a communication system, the method comprising the steps of:
    (a) determining a plurality of distances to nodes within the communication system based on first channel-model parameters, wherein the first channel-model parameters are parameters to an equation relating path-loss to distance;
    (b) producing a first location of the node based on the plurality of distances;
    (c) calculating new channel-model parameters based on the first location, wherein the second channel-model parameters are parameters to the equation relating path-loss to distance;
    (d) recalculating the plurality of distances to nodes within the communication system based on the second channel-model parameters;
    (e) producing a second location of the node based on the recalculated distances; and
    wherein the channel model comprises $$PL_{dB}(d) = \underbrace{PL_{dB}(do)}_{A} + n * 10\ \log(d)$$

where $PL_{dB}(d)$ is the Path Loss in dB at distance d and n is the path loss coefficient that indicates a rate at which path loss increases with distance, and A is a Path Loss in dB at distance do.

2. The method of claim 1 further comprising the step of:
    (f) determining if the second location converges.

3. The method of claim 2 further comprising the step of:
    (g) re-performing steps (c)-(e) if the second location does not converge.

4. The method of claim 1 wherein the step of determining first and second channel-model parameters comprises the step of determining channel model parameters from a channel model relating path loss to separation distance.

5. The method of claim 1 wherein the step of determining the plurality of distances comprises the steps of:
   determining a plurality of received signal strengths;
   determining a plurality of path losses based on the plurality of received signal strengths; and
   determining the plurality of distances to nodes within the communication system based on the plurality of path losses.

6. The method of claim 5 wherein the step of determining the plurality of path losses based on the plurality of received signal strengths comprises the steps of:
   translating the plurality of received signal strengths to a plurality of received powers; and
   translating the plurality of received powers to a plurality of path loss measurements.

7. The method of claim 1 further comprising the step of transmitting the second location.

8. A node comprising:
   a receiver receiving transmissions from a plurality of nodes;
   logic circuitry determining a plurality of distances to nodes within the communication system based on first channel-model parameters and received signal strengths of the transmissions, wherein the first channel-model parameters are parameters to an equation relating path-loss to distance, the logic circuitry additionally producing a first location of the node based on the plurality of distances, updating the channel-model parameters based on the first location, determining a second plurality of distances to nodes within the communication system based on the updated channel-model parameters, and producing a second location of the node based on the second plurality of distances, wherein the updated channel-model parameters are parameters to the equation relating path-loss to distance; and
   wherein the channel model comprises $$PL_{db}(d) = \underbrace{PL_{dB}(do)}_{A} + n*10\log(d) \tag{1}$$

where $PL_{dB}(d)$ is the Path Loss in dB at distance d and n is the path loss coefficient that indicates a rate at which path loss increases with distance, and A is a Path Loss in dB at distance do.

9. The apparatus of claim 8 wherein the logic circuitry determines if the second location converges.

10. The apparatus of claim 9 wherein the logic unit produces a third location if the second location does not converge.

11. The method of claim 8 wherein first and second channel-model parameters are channel model parameters from a channel model relating path loss to separation distance.

12. The apparatus of claim 8 further comprising a transmitter transmitting location estimates.

13. The method of claim 1 wherein the channel model parameters comprise A and n.

14. The method of claim 13 wherein the step of calculating new channel-model parameters comprises the step of calculating a new A and a new n.

15. The node of claim 8 wherein the channel model parameters comprise A and n.

16. The node of claim 15 wherein the step of calculating new channel-model parameters comprises the step of calculating a new A and a new n.

* * * * *

UNITED STATES PATENT AND TRADEMARK OFFICE
CERTIFICATE OF CORRECTION

PATENT NO. : 7,548,517 B2  
APPLICATION NO. : 11/113637  
DATED : June 16, 2009  
INVENTOR(S) : Spyros Kyperountas et al.

Page 1 of 1

It is certified that error appears in the above-identified patent and that said Letters Patent is hereby corrected as shown below:

IN THE SPECIFICATION

1. In Column 3, Line 32, in Equation (1), delete " $PL_{dB}(d) = \underset{A}{\underline{PL_{dB}(do)}} + n * 10\log(d)$ " and insert -- $PL_{dB}(d) = \underset{A}{\underline{PL_{dB}(do)}} + n * 10\log(d)$ --, therefor.
   (ORIGINALLY FILED SPECIFICATION DATED APRIL 25, 2005, PAGE 5, LINE 6, EQUATION (1))

2. In Columns 4 & 5, Lines 65-67 & 1-15, delete "When blindfolded node ...... maximum iterations." and insert the same in Line 64, after "processor 205." as a continuation of the paragraph.
   (ORIGINALLY FILED SPECIFICATION DATED APRIL 25, 2005, PAGES 7 & 8, LINES 22-32 & 1-3)

3. In Column 5, Line 9, before "obtains" delete "30".
   (ORIGINALLY FILED SPECIFICATION DATED APRIL 25, 2005, PAGE 7, LINE 30)

IN THE CLAIMS

4. In Column 6, Line 54, in Claim 1, delete "PLdB(d)" and insert -- $PL_{dB}(d)$ --, therefor.
   (NOTICE OF ALLOWANCE AND FEES DUE (PTOL-85) DATED DECEMBER 1, 2008, PAGE 2, UNDER "EXAMINER'S AMENDMENT", LINE 26)

5. In Column 8, Line 6, in Claim 8, in Equation (1), delete " $PL_{dB}(d) = \underset{A}{\underline{PL_{dB}(do)}} + n * 10\log(d)$ " and insert -- $PL_{dB}(d) = \underset{A}{\underline{PL_{dB}(do)}} + n * 10\log(d)$ --, therefor.
   (AMENDMENTS TO THE CLAIMS DATED NOVEMBER 17, 2008, PAGE 3, CLAIM 8, LINE 14, EQUATION (1))

Signed and Sealed this

Ninth Day of February, 2010

David J. Kappos  
*Director of the United States Patent and Trademark Office*